United States Patent
Hoq et al.

(10) Patent No.: US 6,616,907 B2
(45) Date of Patent: Sep. 9, 2003

(54) CHEMICAL PREPARATION OF CHLORATE SALTS

(76) Inventors: M. Fazlul Hoq, 1367 Boswall Dr., Worthington, OH (US) 43085; Mohammed N. I. Khan, 1008 9th Ave., South, Clear Lake, IA (US) 50428

( * ) Notice: Subject to any disclaimer, the term of this patent is extended or adjusted under 35 U.S.C. 154(b) by 0 days.

(21) Appl. No.: 09/876,625

(22) Filed: Jun. 7, 2001

(65) Prior Publication Data

US 2002/0009412 A1 Jan. 24, 2002

Related U.S. Application Data

(60) Provisional application No. 60/211,189, filed on Jun. 13, 2000.

(51) Int. Cl.$^7$ ................................................. C01B 11/14
(52) U.S. Cl. ........................ 423/475; 423/420; 423/421; 423/422
(58) Field of Search .......................... 423/475, 419.1, 423/420, 421, 422, 424

(56) References Cited

U.S. PATENT DOCUMENTS

| 1,338,234 A | * | 4/1920 | McIlhiney | 423/191 |
|---|---|---|---|---|
| 3,690,845 A | * | 9/1972 | Grotheer | 23/300 |
| 4,101,291 A | | 7/1978 | Marion | |
| 4,339,312 A | | 7/1982 | Brooks et al. | |
| 5,087,334 A | | 2/1992 | Marais et al. | |
| 5,378,447 A | * | 1/1995 | Jackson et al. | 423/475 |
| 5,948,380 A | | 9/1999 | Hoq et al. | |
| 6,287,533 B1 | * | 9/2001 | Khan et al. | 423/478 |

* cited by examiner

*Primary Examiner*—Ngoc-Yen Nguyen
(74) *Attorney, Agent, or Firm*—McKee, Voorhees & Sease, P.L.C.

(57) ABSTRACT

A novel method of producing metal chlorates is described which involves the reaction of ammonium chlorate with metal carbonates and/or metal bicarbonates. The reaction yields extremely pure metal chlorate, as well as ammonia and carbon dioxide by-products. These by-products combine to produce ammonium bicarbonate. The ammonium bicarbonate may then be reacted with sodium chlorate to produce ammonium chlorate, which may be recycled for use in the production of metal chlorates.

19 Claims, No Drawings

CHEMICAL PREPARATION OF CHLORATE SALTS

CROSS-REFERENCE TO RELATED APPLICATION

This application claims priority to provisional application Ser. No. 60/211,189 filed Jun. 13, 2000.

FIELD OF THE INVENTION

The invention relates to the production of industrial chemicals. More specifically, the invention relates to the production of metal chlorates by the reaction of ammonium chlorate with metal carbonates/bicarbonates at elevated temperatures. The invention also relates to the production of ammonium chlorate using by-product solid ammonium bicarbonate and aqueous solution of sodium chlorate.

BACKGROUND OF THE INVENTION

Metal chlorates have been used for a long time as a main raw material in the manufacture of fireworks and matches. Potassium chlorate is also one of the main raw materials in the production of charcoal briquettes and as a pure oxygen generator. Potassium chlorate is a very important worldwide commodity for these purposes.

Existing technologies for commercial production of potassium chlorate involves the use of sodium chlorate/potassium chloride as described in U.S. Pat. Nos. 4,339,312 and 5,087,334. The process of U.S. Pat. No. 5,087,334 involves the double displacement reaction of sodium chlorate and potassium chloride. There are several drawbacks to this process, however. For instance, the double displacement reaction of sodium chlorate and potassium chloride seldomly yields a pure potassium chlorate. Because sodium chlorate and sodium chloride are hygroscopic, the presence of these impurities decreases the burning capabilities of the fireworks, matches, and charcoal briquettes in which the potassium chlorate is included. Moreover, the high moisture content of the sodium chlorate and sodium chloride causes the production of noxious chemicals, such as hydrochloric acid, at high temperatures.

U.S. Pat. No. 4,339,312 describes direct electrolysis of potassium chloride. While electrolysis is often successful in producing pure potassium chlorate, the process is expensive because of the high cost of potassium chloride.

It is therefore a primary objective of the present invention to provide an improved method of producing metal chlorates.

It is a further objective of the present invention to provide an improved method of producing metal chlorates that is simple and environmentally safe.

It is yet a further objective of the present invention to provide a method of producing metal chlorates whereby the waste by-product of the process may be recycled to produce a useful chemical.

It is still a further objective of the present invention to provide a method of producing metal chlorates whereby the resulting metal chlorate is substantially free of impurities.

It is a further objective of the present invention to provide a method of producing non-metal chlorates using waste by-products from the novel metal chlorate production method described herein.

These and other objectives will become apparent from the following description.

SUMMARY OF THE INVENTION

The present invention describes a method of producing metal chlorate through the reaction of metal carbonates/bicarbonates with ammonium chlorate. The reaction is performed in an aqueous medium at elevated temperature under reduced/normal pressure. Evaporation of the reaction mixture produces ammonia and carbon dioxide by-products and a pure metal chlorate. Alternatively, the gaseous ammonia and carbon dioxide by-products can be condensed with water and carbon dioxide to produce ammonium bicarbonate. This ammonium bicarbonate may in turn be used to produce ammonium chlorate by reacting the ammonium bicarbonate with sodium chlorate. The ammonium chlorate can be recycled to produce metal chlorate in accordance with this invention, while the sodium bicarbonate by-product may be used in the production of various industrial chemicals.

DETAILED DESCRIPTION OF THE PREFERRED EMBODIMENT

As set forth above, the present invention discloses a novel method of producing metal chlorate through the reaction of metal carbonates/bicarbonates with ammonium chlorate.

Any source of ammonium chlorate is suitable for use in this invention. The ammonium chlorate is preferably prepared by the double decomposition reaction of ammonium sulfate and barium chlorate. The most preferred source of ammonium chlorate is that produced by the reaction of ammonia and carbon dioxide, as described in U.S. Pat. No. 5,948,380, by the process described in this invention.

Any Group I metal carbonate or bicarbonate is suitable for use in this invention, including lithium, sodium, potassium, rubidium, and cesium carbonates and bicarbonates. Preferred metal carbonates and bicarbonates for use in this invention are those of lithium and potassium.

The metal carbonate/bicarbonate is combined with the ammonium chlorate in a molar ratio of about 1:1 in the case of metal bicarbonates and, in the case of metal carbonates, in a ratio of about 1:2. While the metal carbonate/bicarbonate and ammonium chlorate may be combined in any quantities or ratios, their combination will still result in the 1:1 and 1:2 stoichiometric ratios described above. The reaction proceeds as shown in the following chemical equation:

$$NH_4ClO_3 + MHCO_3 \rightarrow MClO_3 + NH_3 + CO_2 + H_2O \qquad (1A)$$

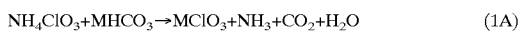
(1B)
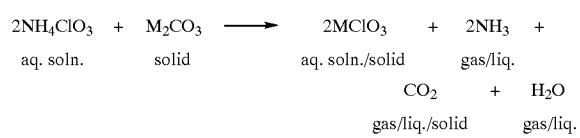

Wherein M=a Group I metal (column 1 element of the periodic table).

The temperature range of the reaction is not critical, and may range from about 5–120° C. The preferred reaction temperature is about 35–80° C. The reaction preferably takes place in aqueous solution under reduced/normal pressure. The reaction is allowed to proceed until most of the liquid in the mixture is evaporated. The liquid may be collected as solid/slurried aqueous ammonium bicarbonate. The solid remaining is pure metal chlorate. Alternatively, the gaseous by-products of ammonia and carbon dioxide may be collected under at reduced to elevated pressure in a range of from 76–7600 mm/Hg, then condensed with water and carbon dioxide to produce ammonium bicarbonate. Excess carbon dioxide may be in the form of dry ice, liquid, or gas.

The condensation process may be carried out in a temperature range of between about −78° C. to 45° C. These reactions are set forth in equations 2 and 3:

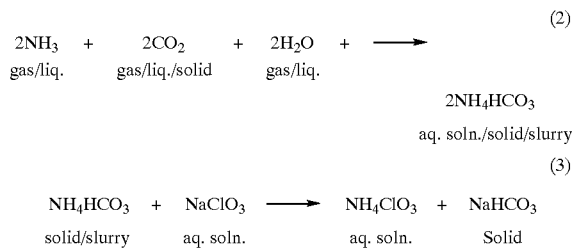

The ammonium bicarbonate by-product manufactured in accordance with this invention, or any other source of ammonium bicarbonate, may be used in preparing ammonium chlorate, that in turn may be recycled to produce metal chlorates as described above. Solid/slurried ammonium bicarbonate is added to about a 1M to saturated solution of equal moles of sodium chlorate. The ammonium bicarbonate and sodium chlorate are mixed to make a fine slurry. The mixing preferably takes place at a temperature range of between about −5° C. to 50° C., with the a preferred temperature range of 15–30° C. and a most preferred temperature of 20–25° C.

Once the compounds have had sufficient time (about 4–8 hours) to equilibrate, a fine crystalline/powder sodium bicarbonate is precipitated. The solid sodium bicarbonate may be separated using conventional techniques such as by commercially available filtration or centrifugation device. The ammonium chlorate-containing filtrate may then be recycled in the preparation of metal chlorates as set forth in equation 1.

The following examples are offered to illustrate but not limit the invention. Thus, they are presented with the understanding that various formulation modifications as well as reactor modifications may be made and still be within the spirit of the invention.

EXAMPLE 1

Preparation of Potassium Chlorate

A 1000 mL water solution of $NH_4ClO_3$ (406 g) was charged into a three neck reactor. $K_2CO_3$ (243.60 g) was added with stirring, and the reaction temperature was raised to 75° C. A vigorous reaction with the liberation of ammonia and carbon dioxide was observed. The ammonia and carbon dioxide were passed to a condenser and collected in a container containing dry ice to yield a slurry of ammonium bicarbonate. The completion of the reaction was monitored by wet litmus paper, that changes color due to the presence of ammonia. The solid left behind in the reactor was pure potassium chlorate ($KClO_3$) in a yield of 99.5%.

EXAMPLE 2

Preparation of Lithium Chlorate

A mixture of $NH_4ClO_3$ (200 g) and $Li_2CO_3$ (72.80 g) in water was stirred at 75° C. Liberated ammonia and carbon dioxide were converted to ammonium bicarbaonate as in Example 1. The solid left behind in the reactor is pure $LiClO_3$, in a yield of 99.5%.

EXAMPLE 3

Preparation of Rubidium Chlorate 200 g of $NH_4ClO_3$ and 227.5 g of $Rb_2CO_3$ in water was reacted at 80° C. to give a pure solid of $RbClO_3$ in a yield of 99.8%. Gaseous by-product ammonia and carbon dioxide were collected as in Example 1.

EXAMPLE 4

Preparation of Cesium Chlorate

A mixture of $Cs_2CO_3$ (311 g) and $NH_4ClO_3$ (200 g) in water was stirred at 75° C. to provide a pure solid of $CsClO_3$ in a yield of 99.5%. Ammonium bicarbonate was collected as in Example 1.

EXAMPLE 5

Isolation of Ammonium Bicarbonate

A solid/aqueous slurry of ammonium bicarbonate was collected from the above reactions after the receiver flask attained room temperature.

EXAMPLE 6

Preparation of Ammonium Chlorate 158 g of solid $NH_4HCO_3$ was added to 333.3 mL of 6M solution of $NaClO_3$ (≈213 g). After stirring the reaction mixture for 30–60 minutes, the resulting mixture was allowed to equilibrate to give a precipitate of solid sodium bicarbonate. Sodium bicarbonate was separated by filtration to give an aqueous solution of ammonium chlorate. This aqueous solution of ammonium chlorate was used as a raw material in the production of metal chlorates as described in the above examples.

Having described the invention with reference to particular compositions and methods, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of producing chlorate salts comprising: reacting a compound selected from the group consisting of a metal carbonate, a metal bicarbonate, and mixtures thereof with ammonium chlorate to produce a metal chlorate and reaction by-products; wherein the metal in the metal carbonate or the metal bicarbonate is a Group I metal.

2. The method of claim 1 wherein the metal is selected from the group consisting of lithium, sodium, potassium, rubidium, and cesium.

3. The method of claim 1 wherein the reacting step takes place at a temperature ranging from about 5–120° C.

4. The method of claim 1 wherein the reacting step takes place at reduced to normal pressure.

5. The method of claim 4 wherein the reacting step takes place at a pressure of about 76–7600 mm/Hg.

6. The method of claim 1 wherein the reacting step takes place in an aqueous solution or slurry.

7. The method of claim 1 further including the step of separating the metal chlorate from the reaction by-products.

8. The method of claim 7 whereby the metal chlorate is separated from the reaction by-products by evaporating the reaction by-products.

9. The method of claim 7 whereby the metal chlorate is separated from the reaction by-products by removing the reaction by-products in a gaseous state.

10. The method of claim 1 further including the step of producing ammonium bicarbonate from the reaction by-products.

11. The method of claim 10 further including the step of introducing excess carbon dioxide and water.

12. The method of claim 11 whereby the excess carbon dioxide is produced by condensation.

13. The method of claim 11 whereby the excess carbon dioxide is present in a form selected from the group consisting of dry ice, liquid, and a gas.

14. The method of claim 10 wherein the ammonium bicarbonate is produced by dissolving the reaction by-products in water.

15. The method of claim 10 further including the step of reacting the ammonium bicarbonate with sodium chlorate to produce ammonium chlorate and sodium bicarbonate.

16. The method of claim 15 wherein the solid ammonium bicarbonate is reacted with a 1M to saturated solution of sodium chlorate.

17. The method of claim 15 wherein the ammonium bicarbonate and the sodium chlorate are stirred.

18. The method of claim 15 wherein the ammonium bicarbonate and the sodium chlorate are allowed to react until the reaction reaches equilibrium.

19. The method of claim 15 further including the step of reacting the ammonium chlorate produced by the reaction of the ammonium bicarbonate and the sodium chlorate with the metal carbonate or the metal bicarbonate.

* * * * *

UNITED STATES PATENT AND TRADEMARK OFFICE
CERTIFICATE OF CORRECTION

PATENT NO.    : 6,616,907 B2
DATED         : September 9, 2003
INVENTOR(S)   : M. Fazlul Hoq and Mohammed N. I. Khan It is certified that error appears in the above-identified patent and that said Letters Patent is hereby corrected as shown below:

Title page,
Item [*] Notice, "0 Days." should read -- -243 days. --.

Signed and Sealed this

Twenty-seventh Day of July, 2004

JON W. DUDAS
*Acting Director of the United States Patent and Trademark Office*